United States Patent [19]

Mizutani et al.

[11] Patent Number: 5,667,813
[45] Date of Patent: *Sep. 16, 1997

[54] MANDREL FOR COOLING

[75] Inventors: Tomozi Mizutani; Katsuyuki Yokota; Masahobu Arita; Hisashi Kojyou, all of Yatsushiro, Japan

[73] Assignee: Kohjin Co., Ltd., Tokyo, Japan

[*] Notice: The term of this patent shall not extend beyond the expiration date of Pat. No. 5,593,703.

[21] Appl. No.: 676,510

[22] Filed: Jul. 8, 1996

Related U.S. Application Data

[63] Continuation of Ser. No. 307,586, Jan. 17, 1995, Pat. No. 5,593,703.

[51] Int. Cl.$^6$ ............................................... B29C 47/88
[52] U.S. Cl. ........................... 425/71; 264/180; 264/560; 264/565; 425/72.1; 425/85; 425/445
[58] Field of Search .......................... 425/71, 72.1, 85, 425/404, 445; 264/180, 560, 565

[56] References Cited

U.S. PATENT DOCUMENTS

| | | | |
|---|---|---|---|
| 3,142,092 | 7/1964 | Ralson | 264/560 |
| 3,337,663 | 8/1967 | Taga | 425/71 |
| 3,622,657 | 11/1971 | North et al. | 264/180 |
| 3,655,846 | 4/1972 | Kanoh et al. | 425/71 |
| 3,702,224 | 11/1972 | North et al. | 425/71 |
| 3,819,776 | 6/1974 | Robinson et al. | 425/71 |
| 3,886,243 | 5/1975 | Uemura et al. | 425/71 |
| 3,976,410 | 8/1976 | Jack et al. | 425/71 |
| 4,003,973 | 1/1977 | Kurokawa et al. | 425/71 |
| 4,203,942 | 5/1980 | Sims, Jr. et al. | 425/71 |

FOREIGN PATENT DOCUMENTS

| | | |
|---|---|---|
| 39-2072 | 2/1961 | Japan. |
| 45-6952 | 10/1970 | Japan. |
| 46-31473 | 9/1971 | Japan. |
| 49-31543 | 8/1974 | Japan. |
| 49-122169 | 10/1974 | Japan. |
| 5-16208 | 1/1993 | Japan. |

*Primary Examiner*—Robert Davis
*Attorney, Agent, or Firm*—Armstrong, Westerman, Hattori, McLeland & Naughton

[57] ABSTRACT

Apparatus for cooling a tubular thin film of thermoplastic resin in a melted state is described. The apparatus is capable of cooling the thin film from both the inside and the outside thereof while setting its diameter by interposing the film between the mandrel and an external circular coolant storage tank. The mandrel has a cylindrical shape and is connected with the lower side of a circular-shaped extruding die wherein the film is extruded downward from a circular slit in the die. The mandrel includes an air-injecting nozzle for injecting compressed air that maintains the shape of an upper bubble part of the thin film formed between the die and the mandrel. A coolant injecting nozzle which can inject the coolant toward the inner surface of the thin film is provided, the coolant injecting nozzle being formed into a single stage of circular slit or two or more stages of circular slits. Also provided is a ring for setting the diameter of the tubular thin film, a discharge port positioned in a side face of the mandrel for discharging the coolant used for cooling into the mandrel, and a seal ring for sealing the coolant in such a manner as to press the thin film, wherein the coolant can be obliquely injected, either downward or upward. The mandrel is useful for rapidly cooling the tubular thin film in a stable manner.

18 Claims, 2 Drawing Sheets

MANDREL FOR COOLING

This is a continuation of application Ser. No. 08/307,586 filed Jan. 17, 1995 and now U.S. Pat. No. 5,593,703, which is a 371 of PCT/JP93/00917 filed Jul. 2, 1993.

TECHNICAL FIELD

The present invention relates to a mandrel for rapidly cooling a thin film or sheet made from thermoplastic resin extruded from a ring-shaped die by directly contacting the inner part of the melted, tubularly formed thin film with coolant.

TECHNICAL BACKGROUND

The most important aspect as regards technique concerned with producing a thin film made of thermoplastic resin is the way in which the shapeless thin film, without substantially containing a so-called crystallized part, is superior in its drawing properties. Therefore, the film is required to be cooled at as fast a rate as possible. That is, the film is required to be rapidly cooled.

Several indirect cooling methods have been proposed wherein melted thin film is contacted with a mandrel for cooling in which the mandrel is cooled by coolant therewithin. However, the rate of cooling by means of an indirect cooling method is lower than that by means of a direct cooling method wherein the melted thin film is directly contacted by the coolant. Therefore, several kinds of apparatus for cooling by directly contacting the melted thin film extruded in the producing step for producing a tubular thin film made of thermoplastic resin have been provided.

For example, there is known a method wherein the melted thin film is solidified by rapid cooling by pressing the melted thin film against a sidewall located outside of tubes in which coolant flows, the coolant being caused to overflow the tubes and flow downward along the sidewall as the melted thin film is pressed on the sidewall. In such device, the coolant is provisionally stored in the lower bubble formed in the underside of a cooling apparatus, and the coolant is discharged by a siphon or a pump (Japanese Examined Patent Publication No. 35192/1970). In another method wherein spirally formed grooves located under a double tube for setting the diameter of the film, the coolant, other than the overflow coolant, flows within grooves in the double tube whereby high speed film productivity is improved. In this device, the coolant is provisionally stored in the bubble formed in the underside of the cooling apparatus, the coolant being discharged by a siphon or a pump, and the like, (Japanese Examined Patent Publication No. 31473/1971). And in still another method, the melted thin film is solidified by contacting the film with the coolant, and the liquid remaining on the film is removed by suction of the liquid (Japanese Examined Patent Publication No. 2072/1964), or like method.

With respect to the method of cooling by means of overflown coolant in accordance with the above-mentioned Japanese Examined Patent Publication No. 35192/1970 and Japanese Examined Patent Publication No. 2072/1964, the overflown coolant flowing downward has a low current velocity. No matter how fast it may flow, the velocity thereof is the same as that of the thin film moving downward. Accordingly, it is difficult to obtain a uniform thin film without having a shape defect since the coolant flowing downward with the thin film becomes high in temperature due to the remaining heat of the thin film so that the cooling capacity of the apparatus is lowered because of partial boiling of the coolant, or there arises a partial bonding caused by contacting directly melted thin film with the mandrel due to an irregularity in the quantity of flow.

Accordingly, in order to produce a thin film with high speed, it is considered to conduct the process by keeping the temperature of the coolant low. However, there is a commercial limitation in such a method. Therefore, it has not been possible to produce the thin film with high speed.

Further, in such direct cooling method, the coolant is directly contacted with the thin film. Therefore, the thin film is wetted so that it is necessary to remove the coolant from the film. However, it is difficult to remove the coolant completely. Accordingly, there are defects due to irregular heating caused by drips or liquid membrane remaining on the thin film when the coolant flowing in the apparatus remains on the film, whereby an irregularity of stretching readily occurs.

Further, with respect to the cooling method disclosed in above-mentioned Japanese Examined Patent Publication No. 31473/1971, cooling is promoted by the lower part of the internal coolant flowing in a spiral groove. However, in the apparatus, the upper side double tube for setting the diameter of the film is cooled by an indirect cooling method. Therefore, there is a limitation of cooling capacity.

Further, with respect to the cooling methods disclosed in Japanese Examined Patent Publication Nos. 35192/1970 and 31473/1971, the coolant is provisionally stored in the lower bubble formed under the cooling apparatus, the coolant being discharged by a siphon or a pump, and the like. In such a method, the stress imposed on the thin film is easily varied by the gravity of the stored coolant. In the extreme case, there is a possibility that the lower bubble is broken. Further, the coolant is not completely removed in the nip rolls portion of the apparatus which collapse the lower bubble. Therefore, the drips of liquid or liquid film remain on the thin film. Consequently, irregular heating occurs when the obtained thin film is stretched. As a result, the irregular stretching easily occurs.

Further, with respect to the cooling method disclosed in Japanese Examined Patent Publication No. 2072/1964 wherein the liquid remaining on the thin film is removed by suction of the liquid, it is impossible to completely remove a large amount of the coolant from the surface. Consequently, drips of liquid or a liquid membrane remain on the thin film. As a result, an irregularity of stretching easily occurs.

Further, in the cylindrical portion of the thin film that is formed by the part thereof which is in a melted state, the shape of the thin film is maintained by injecting compressed air thereinto. However, it is difficult to make a nozzle for injecting compressed air with a slit-like shape continuous in the circumferential direction. Therefore, there are defects in the method, as for example, the internal pressure applied to the thin film by means of streams of compressed air which are injected from the injecting nozzle become non-uniform. Or there are the other defects in the method such as the compressed air forming a thin layer even if the injecting nozzle can be made to be a slit-like shape. Also, intermittent fluctuations of the internal pressure lead to thickness deviations in the thin film, thereby causing thickness deviations of the film after the thin film is stretched.

DISCLOSURE OF THE INVENTION

The present inventors have earnestly investigated the above-mentioned defects in order to attain the present invention.

That is, the present invention relates to a mandrel capable of cooling a melted tubular thin film of thermoplastic resin from inside thereof while setting the diameter of said tubular thin film by interposing the film between a mandrel and an external circular coolant storage tank, said mandrel having a cylindrical shape for connection with a circular-shaped extruding die in the lower of said die, said thin film being extruded downward from a circular slit in said die; said mandrel comprising an air-injecting nozzle for injecting compressed air for maintaining the shape of an upper bubble part of the thin film formed between a die and said mandrel; a coolant-injecting nozzle which can inject said coolant toward an inner surface of said thin film, said coolant-injecting nozzle being formed as a single stage of circular slit or two or more stages of circular slits; a ring for setting the diameter of said tubular thin film; a discharge opening positioned in a side face of the mandrel for discharging said coolant used for cooling into the mandrel; and a seal ring for sealing said coolant in such a manner as to press the thin film; wherein said coolant can be passed obliquely downward or upward.

The mandrel is characterized in that (1) a single stage of the circular-shaped coolant injecting nozzle is provided in the mandrel in such a manner as to inject coolant obliquely, said circular-slit-like shaped injecting nozzle being capable of injecting the coolant between the surface of the ring for setting the diameter and the tubular thin film, (2) two or more stages of the circular-slit-like shaped injecting nozzle are provided in the mandrel, the uppermost stage of said circular-slit-like shaped injecting nozzle being directed obliquely upward for injecting the coolant so as to be capable of contacting the tubular thin film in the counter-current direction, (3) two or more stages of the circular-slit-like shaped injecting nozzle are provided in the mandrel, an uppermost nozzle of said injecting nozzle being capable of injection the coolant obliquely upward in such a manner as to be capable of contacting the tubular thin film in the countercurrent direction, a lowermost nozzle of said injecting nozzle being capable of injecting the coolant between the surface of the ring for setting the diameter of the film tube and the tubular thin film, (4) having a means for slightly adjusting a gap of a slit in the nozzle for injecting the coolant, said means being adjustable in three or more parts on the circle of the slit, (5) having spirally formed grooves for cooling a ring part from the inside thereof by flowing the coolant in the ring part for setting the diameter of the film tube, the grooves being continuously formed from said ring part to a lower part of the mandrel, (6) the circular-slit-like shaped coolant injecting nozzle and/or the other nozzle for supplying the spirally formed groove with coolant being provided with a rectifying vane in the inside of each port of said injecting nozzle, (7) the coolant injecting nozzle being provided with a nozzle for injecting compressed air for maintaining the shape of the upper bubble of the tubular thin film, said bubble being formed between the die and the mandrel, said nozzle for injecting compressed air being provided with a rectifying vane for altering the direction of the compressed air, said vane being positioned in the front side of said nozzle for injecting compressed air, (8) the seal ring being provided with a circular ring for scraping residual coolant remaining on the inner surface of the tubular thin film and an opening for discharging the removed coolant into the mandrel, said ring and said opening being positioned in the lower part of the seal ring, (9) the circular ring for scraping residual coolant being provided with a circular suction ring for removing by suction the coolant which residually remains on the inner surface of the tubular thin film, said circular ring being made of a porous elastic body, the tip of the porous elastic body being connected with a suction mechanism, said suction mechanism being positioned in the lower part of the circular ring, (10) the porous elastic body being covered with hydrophilic woven textile or hydrophilic non-woven fabric, and/or (11) having a chamber for provisionally storing the overflown liquid from the upper part of the injecting nozzle for the coolant, and said chamber further storing the coolant discharged from the discharge opening positioned in the side face of said mandrel in the lower part of said mandrel and the suction ring, said discharged coolant being directed to the mandrel by a discharging mechanism for discharging the coolant from said chamber.

BRIEF DESCRIPTION OF THE DRAWINGS

The present invention will be explained by using FIGS. 1, 2 and 3 as follows.

Figure 1:
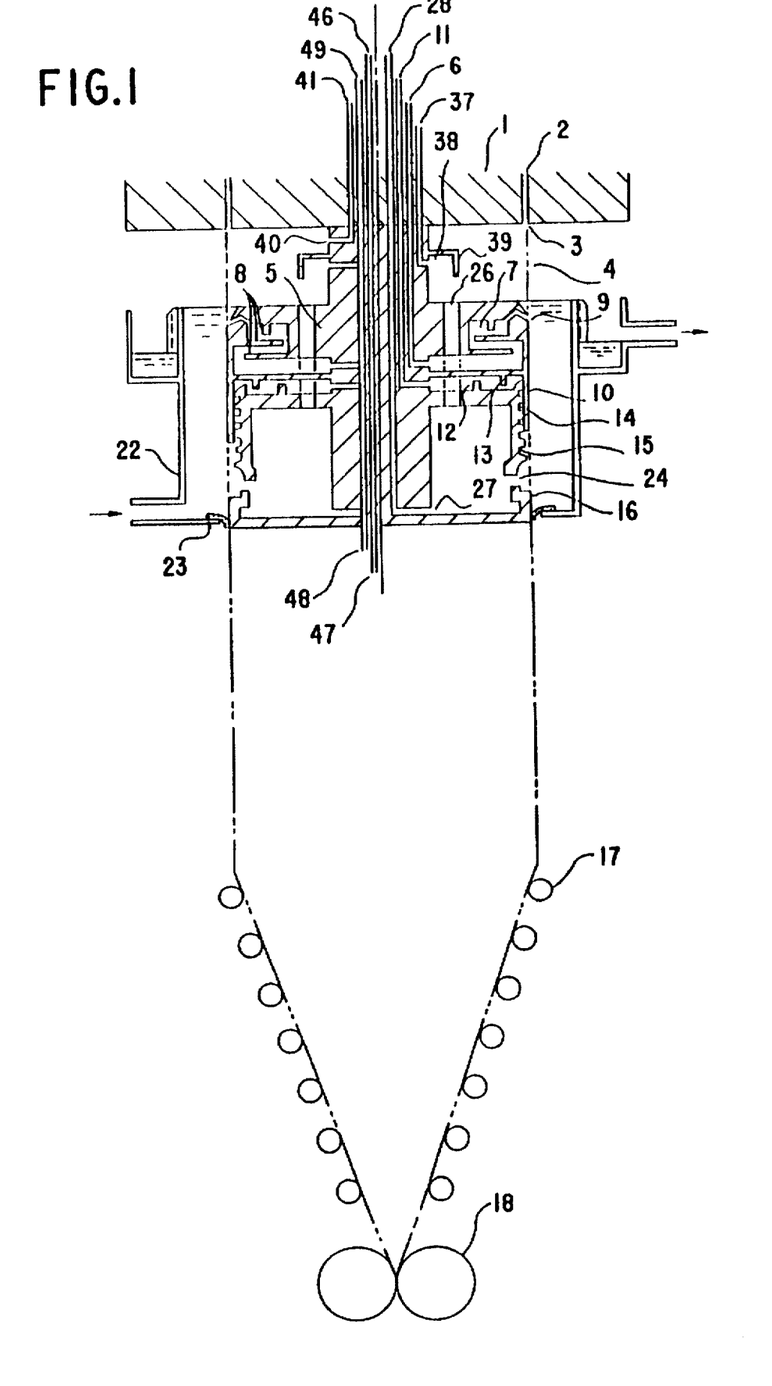
FIG. 1 is an illustration of a basic construction of the present invention.

In FIG. 1, numeral 1 designates a circular shaped die, which faces downwardly, provided on an extruder. Melted thermoplastic resin is extruded downward from the extruder by passing it through an internal, circular shaped passage 2 for exiting circular opening 3. Thereafter, the melted thermoplastic resin is formed into a tubular thin film 4. Numeral 5 designates a cooling mandrel suspended from the circular shaped die. The cooling mandrel 5 comprises a circular injecting nozzle 38 for injecting compressed air, another injecting nozzle 9 for injecting a coolant, a ring 10 for restricting a diameter, an inner cooling part 14 having a spiral groove in one portion, another portion of the part 14, indicated as 15, having a spiral groove, and a seal ring 16, the cooling mandrel having a cylindrical shape.

The mandrel 5 is provided with an injecting nozzle 38 injecting compressed air for upper bubble definition positioned in an uppermost part of the mandrel. For the purpose of controlling the diameter of the upper bubble formed between the die and the mandrel in the tubular thin film, the injecting nozzle 38 for injecting compressed air is disposed in a manner as to direct the air radially. The injecting nozzle 38 is connected with a pipe 37 for introducing the compressed air for producing the upper bubble, said pipe passing through the central part of the die. For the purpose of interrupting the direction of the compressed air directed from the injecting nozzle 38 to the outer surface of the mandrel, a rectifying vane 39 is disposed in front of the nozzle opening. As the rectifying vane, a suitable plate may be a porous plate or a plate having a mesh. By means of the rectifying vane 39, the compressed air is prohibited from directly impinging upon the melted tubular thin film. Consequently, a deteriorating irregularity of thickness of the thin film caused by an irregularity of circumferentially blowing of the compressed air is prevented.

It is necessary to increase a flow rate of the compressed air in order to forcibly discharge air generated at the time when the melted tubular thin film 4 is extruded through a part of the compressed air injected from the injecting nozzle 38 is discharged together with the coolant through a coolant discharge opening 24 disposed on the side face of the mandrel, as well as through additional discharge openings 27 and 28. Therefore, a discharge opening for the compressed air used for the upper bubble is disposed so that the compressed air is discharged through a discharge pipe 41 for discharging the compressed air from the upper bubble. The upper bubble is kept by the balance of supplying and discharging the compressed air.

Under the circular shaped injecting nozzle for injecting the compressed air is the injecting nozzle 9 for injecting the coolant, said nozzle having a circular slit injecting the coolant supplied from the groove formed inside for flowing the coolant. The coolant being injected toward an inner surface of the tubular thin film in a manner as to direct the coolant downward from the horizontal direction. Thereby, the coolant is injected toward a part between the outside of the ring for setting the diameter and the tubular thin film 4 so that the tubular thin film 4 is directly cooled by flowing the coolant downward. A part of the coolant is flown into a common pipe 26 for discharging by overflowing the coolant.

When the injecting nozzle 9 for injecting the coolant is directed horizontally or obliquely upward, the coolant flows downward to lower the cooling capacity of the coolant. By effect of the downward flowing coolant, as shown in the present invention, the rate of downward coolant flow can be larger than that of the thin film. Thus, the cooling capacity can be remarkably large since the coolant having a low temperature is passed downward from the upper side at a rate larger than the increasing temperature of the coolant.

Further, the groove 7 formed inside to conduct the coolant is provided with a rectifying vane 8 for the coolant, whereby a flow of the coolant is rectified and the coolant can be uniformly and radially injected.

By effect of this construction, as mentioned before, the coolant should be uniformly injected from a gap of the injecting nozzle 9 for injecting the coolant. However, there are some cases in which the coolant is not always uniformly injected in the radial direction. If the quantity of the injected coolant is not circumferentially uniform, the coolant is partially retained so that there arises an air retention caused by non-uniform circumferential connecting level of the ring 10 for setting the diameter, and an irregularity of cooling caused by deformation of the thin film, or so-called fingerprint-like irregularity on a surface of the thin film. In an extreme case, there is a possibility of deteriorating of the irregularity of the thin film. Therefore, for the purpose of uniformly injecting the coolant the coolant injecting nozzle 9 is preferably provided with a device (not shown) for slightly adjusting the gap of the injecting nozzle 9. As the device for slightly adjusting the gap, one which is generally or commonly used can be employed. For instance, such a device for slightly adjusting the opening of the air nozzle as to enlarge or restrict the discharge area of each nozzle by rotating a screw, or the like device having similar mechanism, can suitably adjust the size of the opening. It is preferable that three or more devices are circumferentially provided in order to make the flows substantially uniform. Thereby, the coolant injected from the nozzles 9 for injecting the coolant can be finely adjusted in accordance with the conditions so that the circular thin film can be uniformly cooled.

As mentioned above, the coolant can be efficiently injected so that the cooling rate in the neighborhood of the injecting nozzle 9 for injecting the coolant can be at least 150° C./sec. Not to mention, the other cooling rate, due to the external coolant, is added to the cooling rate imposed upon the film. Therefore, the cooling efficiency can be even more increased.

Under the injecting nozzle 9 for injecting the coolant, there is arranged a ring 10 having a smooth surface and being operative to set the diameter of the tubular film. The tubular thin film 4 is cooled by the coolant injected from the injecting nozzle 9 or carried to the outer surface of the ring 10 for setting the diameter while the tubular thin film is cooled. Thereafter, the tubular thin film is cooled while the diameter of the tubular thin film is set by the diameter of the ring 10. Though the diameter of the tubular thin film is defined by the diameter of the ring 10, the coolant injected from the injecting nozzle 9 at high speed is interposed between the outer surface of the ring 10 and the tubular thin film in the form of a film. Therefore, the surface of the ring 10 for setting the diameter of the tubular film is not significantly contacted by the tubular thin film 4 directly. As a result, any scratch or abrasion on the surface of ring 10 does not affect the inner surface of the tubular thin film 4.

Inside the ring 10 for setting the film diameter, there is provided a spirally formed groove 14 wherein the coolant flows. The spirally formed groove 14 is supplied with the coolant, the coolant flowing downward along the groove. The spirally formed groove 14 may be arranged in such a manner that a single or more grooves are arranged parallel with each other. While the coolant for the groove flows in the spirally groove 14, the ring 10 is cooled, thereby the tubular thin film is additionally cooled. This part is indirectly cooled by using an internal cooling method, of which cooling efficiency is smaller than that of a direct cooling method. However, the totality of cooling efficiency is increased.

Below the ring 10 for setting the film diameter, the spirally formed inner groove 14 is continued to form the spiral groove 15. The diameter of the film is controlled by the ring 10. The tubular thin film 4, whose shape is set to a certain degree, is further cooled in such a degree as not to be easily deformed by an external force. The coolant flowing downward along the spirally formed inner groove 14 and the spiral groove 15 flows into the discharge opening 24 disposed on the side face of the mandrel, thus preventing the coolant from flowing downward. The rate of flow of the coolant flowing in the spirally formed groove 14 and the spiral groove 15 can be controlled to be low in the case of producing the film at low speed. For the purpose of increasing the cooling efficiency by directly cooling the ring 10 for setting the diameter, and increasing the cooling efficiency by indirectly cooling the lower part of the spiral groove 15, it is preferable to meet a formula as follows:

$$\text{rate of flow} > \frac{\text{rate of producing the film}}{\text{SIN(inclination angle of spiral)}}$$

In the part which is directly cooled by the coolant flowing in the spiral groove, the thin film is almost fixed. Therefore, the rate of flow of the coolant can be sufficiently increased, while the cooling efficiency for cooling the ring 10 for setting the diameter is secondarily increased. The mean value of rate of flow in the spiral groove is related to not only the rate of flow but also to the size and number of grooves forming the spirally formed inner groove 14 and the spiral groove 15.

The quantity of flow in the spiral groove is related to the size of the circular thin film. In case of the thin film having a small diameter, the quantity of flow of the coolant flowing in the lower side may be small. In case of the thin film having a large diameter, it is necessary to flow a large amount of the coolant. Accordingly, a device, such as a pump capable of injecting a quantity of coolant to meet the above formula, is required to be provided in order to increase the quantity of the coolant.

Under the spirally formed inner groove 14 and the spiral groove 15, there is provided a ring 16 for sealing. The ring 16 for sealing prevents the coolant stored in the external storage tank 22 from leaking downward by pressing against an elastic ring 23, said elastic ring 23 being provided on the bottom of the external coolant storage tank to permit passage of the tubular thin film. In this way, a large amount of the coolant is prevented from leaking. Furthermore, the tubular thin film is tensioned by pressing the elastic ring 23 to perform a brake effect. This brake effect has an important function to control a variation of rate of drawing the tubular thin film 4, said variation being caused by the weight of the tubular thin film. In order to selectively adjust the brake effect, suitable material and surface roughness of the seal ring 16 are selected in accordance with a material by which the tubular thin film is made.

The apparatus also includes a pipe 37 for introducing the compressed air for the upper bubble, an opening 6 for introducing the coolant, an opening 11 for introducing the coolant in the spiral groove, an opening 28 for discharging the coolant, a pipe 46 for introducing the compressed air for lower bubble, a pipe 41 for discharging the compressed air for upper bubble, and a pipe 49 for discharging the compressed air for the lower bubble. The, thus-shaped tubular thin film 4 by cooling the tubular thin film is collapsed by rolls 17 by means of a common method, thereafter the thus-collapsed tubular film is drawn by a nip roll 18.

As the external tank 22 for storing the coolant used in the present invention, a known type of the tank 22 can be sufficiently employed. While the coolant stored in the external tank 22 is partially renewed by overflowing of the coolant, the level of the tank is adjusted so that the level is substantially coincident with that of the upper surface of the mandrel 5.

Figure 2:
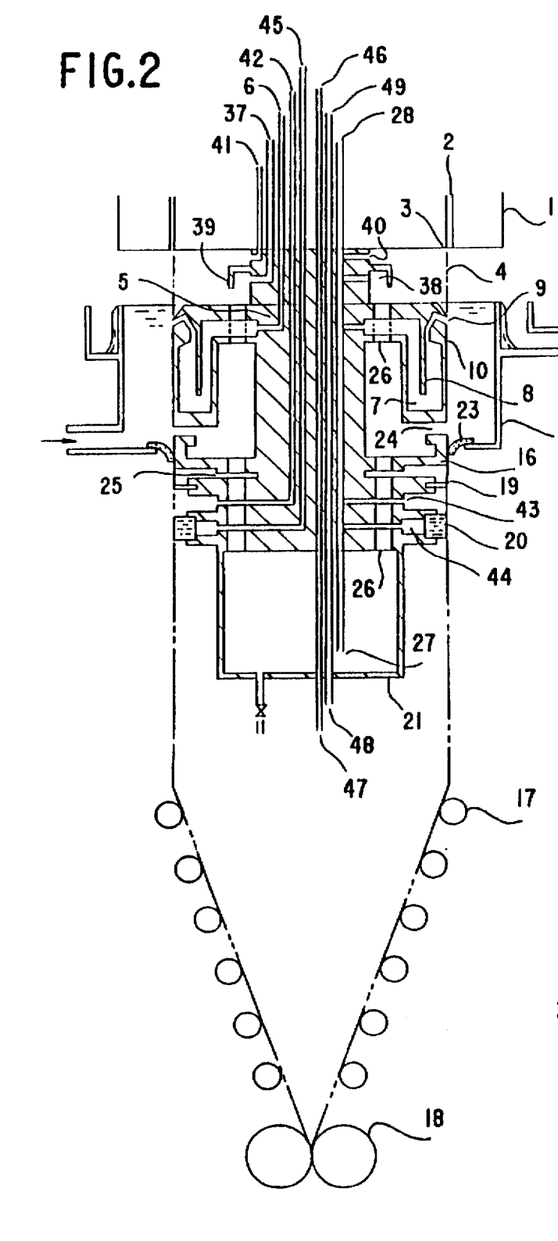
FIG. 2 is an illustration of a spirally formed groove disposed inside a lower side of the multi-staged nozzle and the ring for setting the film diameter.

Further, the construction shown in FIG. 2 will also be explained. The cooling apparatus shown in this figure does not include a cooling mechanism using a spiral groove in comparison with the apparatus shown in FIG. 1. However, the injecting nozzle 38 for injecting compressed air for the upper bubble, the injecting nozzle 9 for injecting the coolant, the ring 10 for setting the diameter of the film, and the ring 16 for sealing are identical with those shown in FIG. 1. With respect to the apparatus shown in FIG. 2, under the ring 16 for sealing, there are included a ring 19 for removing coolant, a suction ring 20 and a chamber 21 for storing the coolant.

The coolant removed by the ring 19 is discharged via a lower opening 25 for discharging the coolant. The suction ring 20 disposed under the ring 19 sucks the coolant slightly remaining on the surface of the tubular thin film to remove excess coolant.

If need be, it is effective to arrange two or more suction rings. Even if there are large amounts of coolant removed, the spent coolant is removed through the opening 24 for discharging coolant disposed on the side face of the mandrel and the opening 25 for discharging coolant disposed on the lower part thereof. Therefore, the amount of coolant to be removed by the suction ring 20 is small as to obtain complete coolant removal from the thin film.

The suction ring 20 is composed of a ring made of a perforated plate and a perforated elastic body which is disposed on a tip of the suction ring, thereby the coolant remaining on the tubular thin film is completely removed by suction thereof. However, if the perforated plate is covered with hydrophilic woven textile or hydrophilic non-woven fabric, or the like, the efficiency of removing the coolant can be still be improved.

The coolant injected from the cooling nozzle 9, the overflow coolant from storage tank 22, the coolant flowing from the coolant discharge opening 24 disposed in the side face of the mandrel 5, the coolant flowing into the discharge opening 25 disposed in the lower part of the mandrel, and that removed by the ring 19 is delivered to the chamber 21 for storing the coolant via common discharge pipe 26. Thereafter, the coolant collected in the chamber 21 is discharged therefrom via the flow passage between openings 27 and 28 for discharging the coolant.

By means of the coolant removal ring 19, the suction ring 20 and the chamber 21 for storing the coolant, it is not necessary to provisionally store the coolant in the lower bubble formed beneath the cooling apparatus. Therefore, any irregularity of stretching caused by either a variation of the rate of drawing the thin film or that resulting from storing coolant in the lower bubble, can be controllably removed or the residual coolant can be prevented from being removed.

The shape of the lower bubble can be kept by adjusting the amount of compressed air which is supplied to the air injecting nozzle 47 for the lower bubble, and by adjusting the amount of compressed air discharged from the pipe 49 for discharging compressed air from the lower bubble and coolant absorbed through the suction ring 20.

The die 1 is provided with a pipe 41 for discharging the compressed air from the upper bubble, a pipe 37 for introducing compressed air to the upper bubble, an opening 6 for introducing coolant, a pipe 42 for introducing compressed air for the suction opening 44, a pipe 45 for evacuating the suction opening, a pipe 46 for introducing compressed air to the lower bubble, a pipe 49 for discharging compressed air from the lower bubble and an opening 28 for discharging coolant from chamber 21. These pipes all penetrate the center of the die, as shown.

Then, the characteristic of the construction shown in FIG. 3 will be explained.

In the present invention, the coolant injection nozzle can have two or more stages for injecting coolant. In the case of providing two or more stages of the nozzle, it is preferable that the lowermost coolant injecting nozzle, shown at 9 in FIG. 3, be capable of injecting the coolant in a direction obliquely downward in the same manner as the injecting nozzle 9 for injecting the coolant shown in FIG. 1. When the coolant is injected in the horizontal direction or in the direction obliquely upward, as shown in FIG. 3, the cooling rate of the tubular thin film flowing downward will be the same as the rate of moving of the tubular thin film, or will be lower than that of moving of the tubular thin film. Therefore, the cooling capacity of the coolant flowing downward together with the tubular thin film 4 decreases. By means of downward injection of the coolant at the rate of flow of the tubular thin film, the coolant having a lower temperature in flowing downward from the upper part of the mandrel more rapidly than the temperature of the coolant increases due to absorption of the internal heat of the tubular thin film, the cooling capacity can be remarkably increased.

In this embodiment, the uppermost nozzle 30 for injecting coolant is preferably directed obliquely upward in order to obtain counterflow cooling wherein cooling efficiency is high. An intermediate nozzle 34 of the coolant injecting nozzles for injecting coolant in three or more stages is not desirably provided with the nozzle directed upward, since the nozzle is arranged under the nozzle directed downward. However, the direction of upward or downward is suitably selected in accordance with the property of the resin of which the tubular thin film is made.

Further, the shape of the uppermost injecting nozzle 30 for injecting coolant is determined by the property of the resin of which the tubular thin film is made. For instance, in the case of a resin whose rate of solidification is high, a height h of a bank dike 29 disposed on the upper side of the nozzle can be small, whereas the height h of the bank dike 29 is high to be effective in the case of a resin whose rate of solidification is low.

Please note that the circular nozzle for injecting coolant is provided with a pipe for introducing the coolant to each of the respective of the two or more stages of the circular nozzle.

BEST MODE FOR CARRYING OUT THE INVENTION

The present invention in accordance with following examples will be explained more concretely. However, the present invention is not limited to the examples.

EXAMPLE 1

The melted tubular thin film formed of poly-ε-capramid having a relative viscosity of 3.5 is extruded from the circular die 1 having a circular slit with an extruding diameter of 300 mm at 260° C. The melted tubular thin film is rapidly cooled by sliding along the outer wall of a cooling mandrel 5 having a shape as shown in FIG. 1. After the tubular thin film is collapsed by the rolls 17, the tubular thin film is drawn to produce a film by the nip rolls 18 at a rate of 20 m/min. At that time, the tubular thin film 4 is cooled by the external storage tank 22 for cooling. The external storage tank 22 for cooling prevents the coolant from leaking in a manner that the axial portion of the external storage tank has an opening in which the mandrel is accommodated, the seal ring 16 being pressed by the elastic ring 23 provided on the bottom of the external storage tank, with the tubular thin film 4 being interposed between the elastic ring and the seal ring.

The cooling mandrel 5, which is employed in the example, has a maximum diameter to define a shoulder portion for receiving the ring 10 for setting the film diameter. The ring 10 has a diameter of 298 mm, a length of 125 mm. The mandrel 5 has a length of 150 mm, including the ring 10 for setting the film diameter and the spiral groove 15, and a maximum diameter of the ring 16 for sealing of 296 mm. The surface contacted by the resin, of which the tubular thin film is made, is mirror-like-chrome-plated. Inside the film diameter setting ring 10, the spirally formed inner groove 14 conducts coolant having a temperature of 20° C. and is enclosed by the setting ring, thereby the setting ring 10 is cooled from the inside. The coolant flowing in the spirally formed groove 14 is supplied through an inner path 12 for coolant supplied from the opening 11 for introducing the coolant, then discharged through the spirally formed groove 15 and the discharge opening 24 disposed on the side face of the mandrel, from the opening 28 for discharging the coolant.

Moreover, the compressed air supplied by the pipe 37 for introducing compressed air for the upper bubble and the pipe 46 for introducing compressed air for the lower bubble, and the compressed air discharged from the air discharge pipe 41 for the upper bubble and the discharge pipe 49 for the lower bubble are controlled to prevent collapse of the film in the upper and the lower parts of the cooling mandrel. At that time, the injecting nozzle 38 for injecting the compressed air for the upper bubble is provided with a flow rectifier 39 for rectifying the compressed air for the upper bubble, said flow rectifier being spaced 25 mm from the injecting nozzle, the width of the flow rectifier being 50 mm so that the flow of compressed air for the upper bubble is not directly received by the melted tubular thin film 4.

Further, water is supplied through the coolant inlet opening 6 at rate of 1.0 ton/h, the coolant having a temperature of 20° C. The water flows in the inner coolant flow passage 7 and thereafter, is discharged from the coolant injecting nozzle 9 in such a manner as to be injected downward at 45° relative to the horizontal. The inner grove is provided with a rectifier 8 for rectifying the coolant. The injecting nozzle 9 has a slit gap of 0.8 mm. The rate of injecting the coolant is about 37 cm/sec. This rate is larger than the rate of the melted thin film flowing downward, such rate being about 33 cm/sec. At that time, the cooling rate in the region adjacent the circular slit nozzle 9 is 180° C./sec when no external cooling is present. Further, the irregularity of injecting the coolant in the coolant injecting nozzle 9 reduced to a rate of at most 5% by adjusting eight push bolts and eight pull bolts (not shown) disposed in a disc positioned in the upper side of the slit constituting the circular coolant injecting nozzle 9.

On the other hand, water can be supplied through the coolant inlet opening 11 at the rate of 3.4 ton/h, and a temperature of 20° C., the water flowing in the internal path defined by the spirally formed groove 12 for the coolant which is provided with a spiral rectifier for rectifying the coolant therein. The water flows downward in the spiral groove portion 14 and the spirally formed groove portion 15 each groove portion having twelve grooves with each groove being inclined at 12 degrees. At that time, a rate of coolant flow flowing vertically is about 42 cm/sec, such rate being about 30% larger than the rate of flow of the thin film, which is about 33 cm/sec.

The coolant flows into the inside of the cooling mandrel through the discharge opening 24 disposed in the side face of the mandrel. Also, coolant is discharged through the common discharge pipe 26 for discharge through the coolant discharge pipe 27 and coolant discharge outlet opening 28.

On the other hand, the external coolant storage tank 22 is supplied with water at a rate of 3.7 ton/h and a temperature of 20° C., so that the tubular thin film is cooled from the outside as well. At that time, the level of the storage tank 22 for cooling is adjusted so that the level of the internal coolant is about the same level of the external coolant.

The coolant in the external storage tank 22 is prevented from downward leaking by the pressing of the elastic ring 23 toward the seal ring 16 with the tubular thin film interposed therebetween.

At the same time, the extrusion pressure of the resin is adjusted so that downward movement of the film due to the weight of the tubular thin film 4, or in other cases, vibration of the tubular thin film are prevented by controlling the braking effect against the drawing of the tubular thin film, such vibration being a phenomenon caused by reducing the rate of sliding movement of the film between the seal ring and the elastic ring.

The lower bubble formed under the cooling mandrel is controlled by the compressed air supplied through the pipe 46 for introducing compressed air to the lower bubble and the compressed air discharged from the air discharge pipe 49 in order for the lower bubble to be a suitable bubble. In the case of the pressure of the compressed air which is rather high, wrinkles are easily formed on both sides of the tubular thin film when the tubular thin film is pressed by the nip roll 18 following the rolls 17 for collapsing the tubular thin film.

The thus-obtained thin film has a mean thickness of 135 μm, within a range of deviation of 10 μm, and has good transparency.

Besides, the thus obtained tubular thin film is stretched by a common method using a tubular biaxial stretching apparatus. As a result, the stretching property is good.

COMPARATIVE EXAMPLE 1

In Comparative Example 1, the tubular thin film 4 was cooled in the same way as in Example 1 after removing the rectifier for the upper bubble. As a result, the melted tubular thin film 4 was vibrated by directly receiving the compressed air so that the range of the thickness deviation was remarkably deteriorated to 31 μm. Therefore, the amount of compressed air was decreased to such a degree that the thin film was not vibrated. As a result, the tubular thin film was non-uniformly brought into contact with the ring for setting the film diameter, so that film productivity was lowered, and the rate of cumulating monomers was increased.

COMPARATIVE EXAMPLE 2

The tubular thin film was cooled in the same way as in Example 1, except that the coolant was injected from the injecting nozzle 9 in which the direction of injecting the coolant was changed to the horizontal direction as compared with Example 1. As a result, the amount of coolant flow into the region between the film diameter setting ring 10 and the tubular thin film was small, and the cooling capacity for cooling the tubular thin film was low. Therefore, the tubular thin film was not sufficiently solidified by cooling. Hence, the flatness (or uniformity) was deteriorated, and irregular transparency resulted. As the amount of coolant was increased, the tubular thin film was expanded outwardly so that the flatness and the unevenness of the thickness were reduced.

COMPARATIVE EXAMPLE 3

The slit gap of the coolant injecting nozzle 9 was constructed in such a manner as to be uniform. However, it is difficult to make the flow of coolant in the coolant flow path uniform. Therefore, the slit gap was necessary to be slightly adjusted since the irregularity of injection resulted.

EXAMPLE 2

Figure 3:
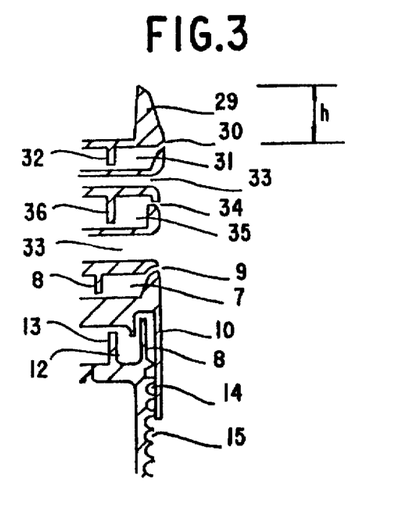
FIG. 3 is an illustration of a construction wherein a ring for removing coolant, a suction ring and a chamber for storing the coolant are added.

(The nozzle portion of the apparatus shown in FIG. 1 was modified to the multiple staged nozzle shown in FIG. 3)

A melted tubular thin film 4 made of polypropylene resin (MI=2.3, content of ethylene 4%) was extruded from the circular die 1 having a circular slit, the diameter of which was 300 mm, with the tubular thin film being extruded at 260° C. Therefore, the tubular thin film was slid on the outer wall of the mandrel 5 wherein the coolant injecting nozzle 9 of the mandrel, constructed as shown in FIG. 1, was modified to a two staged nozzle (with no intermediate stage in accordance with the multiple staged nozzle explained in FIG. 3). In turn, the tubular thin film 4 was collapsed by the collapsing rolls 17, and drawn by the nip rolls 18 at the rate of 30 m/min for the purpose of producing the film. Further, the tubular thin film 4 was cooled on both sides thereof by means of coolant injected from the cooling mandrel 5 and external coolant stored in the external coolant storage tank 22.

The mandrel employed in the example had a film diameter setting ring 10, the maximum diameter of the shoulder portion of which was 298 mm, a shell portion length of 125 mm, a length of the totally constructed cylindrical body being 270 mm, a seal ring 16 whose maximum diameter was 296 mm, and the surface at which the outer surface of the mandrel was contacted by the tubular thin film 4 was mirror-like chromeplated.

The upper and lower thin film bubbles were respectively formed by controlling the compressed air which was supplied by the compressed air inlet pipe 37 for the upper bubble and the compressed air inlet pipe 46 for the lower bubble and the compressed air discharged by the pipe 41 for discharging compressed air from the upper bubble and the pipe 49 for discharging compressed air from the lower bubble.

Further, water was supplied through the opening for introducing coolant for the upper stage at rate of 1.1 ton/h. Water was also supplied through the opening 6 for introducing the coolant at rate of 0.9 ton/h. Therefore, water was injected from the upper injecting nozzle 30 and the coolant injecting nozzle 9, each of the injecting nozzles 9, 30 having a slit gap of 0.8 mm. The coolant from the upper nozzle obliquely upward, thereby the tubular thin film was cooled by a countercurrent flow. The intermediate coolant cooled the film by injecting the coolant obliquely downward while both the intermediate coolant and the tubular thin film moved downward.

The cooling water for the upper stage was caused to flow into the common discharge pipe 26 while a part of the cooling water overflowed. Further, the cooling water was passed into the common discharge pipe 26 from the discharge opening 33 of the coolant injection nozzle, the discharge pipe being disposed between the coolant injecting nozzle 30 of the upper stage and the coolant injecting nozzle 9. Further, the cooling water injected from the coolant injecting nozzle 9 was partially passed into the common discharge pipe 26 from the above-mentioned discharging opening 33, and the other cooling water was partially flown downward together with the tubular thin film 4 passing downward so that the coolant was smoothly passed into the coolant discharge opening 24 disposed in the side face of the mandrel. Thereafter, the cooling water and the other cooling water were joined in the cooling mandrel 5 and discharged therefrom through the coolant discharge opening 27 and the coolant discharging outlet 28.

On the other hand, water having a temperature of 20° C. was supplied through the coolant inlet opening 11 to the spiral groove 14 at the rate of 1.2 ton/h. The water was passed downward in the spirally formed groove 14 and the spiral groove 14 through the internal spiral-shaped path 12 for the coolant flowing therein, and containing rectifier 13 for rectifying the flow of the coolant flowing in the spiral groove, each of said spirally formed groove portion 14 and the spiral groove 15 having twelve grooves, each with an inclination angle of 12 degrees.

The coolant passed from the spiral portion 15 was conducted into the inside of the cooling mandrel through the discharge opening 24 disposed in the side surface of the mandrel. Thereafter, the coolant was discharged through the coolant discharge outlet 28.

On the other hand, the external coolant storage tank 22 was supplied with water having a temperature of 20° C. at a rate of flow of 3.4 ton/h so that the tubular thin film 4 was cooled from the outside thereof. At that time, the water level of the external coolant storage tank 22 was adjusted so that the cooling water level of the mandrel 5 was substantially the same as that of the external storage tank 22.

The external cooling water in storage tank 22 was prevented from leaking by the pressing of the elastic ring 23 toward the seal ring 16 with the tubular thin film being interposed between the elastic ring 23 and the seal ring 16.

At the same time, vibration based on the falling down of the film due to the weight thereof, or vibration in the reverse case (the phenomenon occurring in the direction of drawing the tubular thin film caused by lowering the sliding property between the film and the seal ring, or between the film and the elastic ring 23) was prevented from occurring by controlling the brake effect against the tubular thin film being drawn.

The thus-obtained thin film had a mean thickness of 300 μm, with a thickness deviation in the range of 10 μm, and good transparency.

COMPARATIVE EXAMPLE 4

In Comparative Example 4, the tubular thin film was cooled by using the internal mandrel in which the upper stage coolant injecting nozzle 30 was removed, in substantially the same way as in Example 2. As a result, the cooling effect was rather low. Therefore, the film transparency was lowered, and the stretching property of the film deteriorated.

It was required to lower the rate of producing the film (i.e. rate of producing and drawing the film by means of nip roll 18) to 23 m/min in order to obtain the same transparency as in Example 2.

EXAMPLE 3

(The apparatus of FIG. 2 is employed.)

The melted tubular thin film made of polypropylene resin (MI=2.3 and an ethylene content of 4%) is extruded from the circular die having a circular slit, the diameter of which is 300 mm, and a resin temperature of 260° C. Thereafter, the tubular thin film is slid on the outer surface of the cooling apparatus having a shape as shown in FIG. 2, and the tubular thin film is collapsed by the collapsing rolls 17. In turn, the tubular thin film is drawn at a rate of 20 m/min by the nip roll. At that time, the tubular thin film 4 is cooled from the outside thereof by using the external storage tank 22 for cooling so that the tubular thin film can be inward and outward cooled.

The mandrel is encircled by the external storage tank. The coolant is prevented from leaking by the elastic ring 23 disposed in the bottom of the hollow space which is pressed toward the seal ring 16 of the mandrel 5 with the tubular thin film 4 being interposed between the elastic ring and the seal ring.

The cooling apparatus employed in Example 3 has a film diameter setting ring 10, the maximum diameter of the shoulder portion of said ring 10 being 298 mm, the length of said ring 10 being 250 mm, and a seal ring 16, the maximum diameter of said seal ring 16 being 296 mm. The surface of the cooling apparatus which is contacted with the film is mirror-like chromeplated.

The thin film bubbles positioned at upper and lower part of the cooling apparatus 5 are formed by controlling the compressed air supplied from the port 46 introducing the compressed air for the lower bubble, and the other compressed air discharged through the discharging pipe 41 for the upper bubble and the discharging pipe 49 for the lower bubble. The rectifier 39 for rectifying the compressed air for the upper bubble is fixed to the mandrel body 25 mm radially outward from the compressed air injecting nozzle 38 for the upper bubble, the width of said rectifier being 50 mm. Therefore, the upper compressed air is not directly received by the melted thin film.

Further, water is supplied through the opening 6 for introducing the coolant at the rate of 1.0 ton/h, at a temperature of 20° C. Thereafter, the water flowing through the coolant groove 7 is injected from the circular-slit-like coolant-injecting nozzle 9 having a slit gap of 0.8 mm in the direction of 45° obliquely downward. The rate of injecting coolant is about 37 cm/sec, such rate being adjusted in a manner as to be somewhat larger than velocity of the melted thin film 4 passing downwardly at a velocity of about 33 cm/sec. The water that overflows passes into the common discharge pipe 26 disposed in the upper side. The other water is passed downward together with the downwardly passing tubular thin film 4 to smoothly flow into the discharge opening 24 disposed in the side face. The flows of water are joined in the cooling apparatus, and, in turn, flow into the storage chamber 21 through the lower discharge opening 25 and the common discharge pipe 26.

The slight amount of residual cooling water on the tubular thin film is scraped by the coolant removal ring 19 and, in turn, flows into the coolant storage chamber through the lower discharge opening 25 and the common discharge pipe 26.

At that time, at least 99% of the cooling water is ejected, then the ejected cooling water flows into the coolant storage chamber. Thereafter, the cooling water is discharged out of the system from the chamber 21 through the discharge opening 28 by a self-primping pump.

Further, the cooling water remaining on the surface of the tubular thin film 4 is completely removed by the suction ring 20 positioned beneath the coolant removal ring 19. At that time, the internal pressure is controlled the compressed air withdrawal pipe 42 for operating the suction part so that the portion of the tubular thin film 4 between the ring 19 and the suction ring 20 is prevented from the distorting due to suction through the suction ring 20.

On the other hand, the external coolant storage tank 22 for cooling is supplied with the water at the rate of 3.7 ton/h, the temperature of said water being 20° C. so that the tubular thin film 4 is cooled from the outside thereof. At that time, the water level of the external coolant storage tank 22 is adjusted so that the level of the cooling water flowing in the mandrel is substantially the same as that of the external coolant storage tank.

The external cooling water is prevented from downward leaking by the pressing of the elastic ring 23 toward the seal ring 16 with the tubular thin film being interposed between the elastic ring 23 and the seal ring 16.

At the same time, the vibration due to the downward movement of the thin film or the reverse case (the phenomenon of slightly vibrating in the direction of drawing the film caused by lowering the sliding property between the film and the seal ring, or between the film and the elastic body) of the tubular thin film is prevented from occurring by adjusting the force of pressing the elastic ring toward the seal ring, thereby controlling the brake effect against the drawing of the thin film.

The tubular thin film 4 is collapsed and drawn by the nip roll 18 through the collapsing rolls 17.

The thus obtained thin film has a mean thickness of 300 μm, with a range of thickness deviation being 11 μm, and a good transparency.

Besides, the thus obtained tubular thin film is stretched by the common method of using a tubular biaxial stretching apparatus. As a result, the stretching property of the film is good so as to enable the film to be uniformly stretched.

COMPARATIVE EXAMPLE 5

The tubular thin film was made in the same way as Example 3 except that the coolant removal ring 19 was removed from the apparatus of Example 3. Thereby, the residual cooling water remaining on the tubular thin film 4 was attempted to be removed by the suction ring 20. However, the cooling water remaining on the tubular thin film was so much that the cooling water was difficult to remove completely by using the suction ring 20. Therefore, the drawn tubular thin film, which was not stretched, had water droplets inside the film. The film was further stretched by the biaxial stretching apparatus. As a result, there arose an irregularity of stretching.

COMPARATIVE EXAMPLE 6

The film was produced in the same way as Example 3 except that the suction ring 20 was removed. As a result, the tubular thin film had water droplets inside thereof. The film was further stretched by the biaxial stretching apparatus. As a result, there arose an irregularity of stretching the same as occurred in Comparative Example 5.

COMPARATIVE EXAMPLE 7

After the coolant storage chamber was removed, the cooling water provisionally joining the cooling apparatus and the other cooling water flowing into the lower discharge opening 25, it was attempted to eject the water by providing each discharge pipe respectively. However, the rate of flow of the internal cooling water was not constant. Therefore, there was a tendency for the rate of discharge of the cooling water to vary together with a variation in the upper and lower bubble. Therefore, a uniform thin film could not be obtained.

INDUSTRIAL APPLICABILITY

The apparatus of the present invention relates to a mandrel for cooling wherein a melted tubular thin film extruded downwardly from a slit in a circular die can be rapidly cooled on both sides of the thin film by the direct cooling method using coolant combined with that in an external storage tank while setting the diameter of the tubular thin film. Further, the film can be produced at high speed. Furthermore, in the case of producing the film made of thermoplastic resin, which tends to crystallize, crystallization is remarkably prevented since the cooling rate is so high. Therefore, a tubular thin film which has a superior transparency, impact resistance, and stretching property can be produced. Further, when the apparatus is further provided with a coolant removal ring, and a suction ring, the tubular thin film produced has very little residual water remaining on the inner surface of the film. As a result, the tubular thin film can be biaxial-stretched without need of any process for ejecting the water in the off-line.

We claim:

1. For use with a die containing a downwardly directed circular slit for extruding a tubular thin thermoplastic resin film in a melted condition, apparatus for cooling said tubular thin film while setting the diameter thereof, said apparatus comprising:

a mandrel having a body of cylindrical shape connected to said die in spaced relation to a lower surface thereof and including:
an air injecting nozzle operative to inject compressed air into the space formed between said lower die surface and said mandrel body to maintain the shape of an upper bubble part of said thin film between said die and said mandrel;
a coolant injecting nozzle formed with at least one stage of annular slits and being operative to inject coolant obliquely upwardly or downwardly toward an inner surface of said thin film for cooling said film, a ring for setting said diameter of said thin film, concentrically mounted on said body;

means in said mandrel body for conducting coolant for cooling an interior side of said film diameter setting ring;

an external coolant storage tank concentrically mounted on said mandrel body and disposed for interposing said tubular thin film between said tank and said mandrel body;

means for conducting coolant for cooling said film through said coolant storage tank;

a coolant discharge opening in a side face of said mandrel operative for receiving coolant used to cool said film into said mandrel body; and a seal ring on said mandrel body operative to prevent leakage of said coolant, said seal ring pressing said thin film while permitting passage thereof.

2. The apparatus for cooling the tubular thin film according to claim 1, wherein a single stage of the coolant injecting nozzle is provided in the mandrel body in such a manner as to be directed obliquely downward to inject coolant between the surface of the film diameter setting ring and the tubular thin film.

3. The apparatus for cooling the tubular thin film according to claim 1, wherein a plurality of stages of the coolant injecting nozzle are provided in the mandrel body, and in which an uppermost stage of said injecting nozzle is directed obliquely upward for injecting coolant for contacting the tubular thin film in a countercurrent direction.

4. The apparatus for cooling the tubular thin film according to claim 1 wherein a plurality of stages of the coolant injecting nozzle are provided in the mandrel body, and in which an uppermost nozzle of said injecting nozzle is directed obliquely upward for injecting coolant for contacting the tubular thin film in a countercurrent direction, and a lowermost nozzle of said injecting nozzle is directed for injecting coolant between the surface of the film diameter setting ring and the tubular thin film.

5. The apparatus for cooling the tubular thin film according to claim 1 including means circumferentially spaced about said mandrel body for adjusting flow of coolant from the coolant injecting nozzle.

6. The apparatus for cooling the tubular thin film according to any one of claims 2, 3 or 4 including spirally formed grooves formed on said mandrel body for conducting coolant, and said film diameter setting ring enclosing said grooves whereby the inside of said ring is cooled by the coolant flowing in the grooves, said grooves extending continuously along said mandrel body from said ring to a lower portion of said mandrel body.

7. The apparatus for cooling the tubular thin film according to claim 6 including means for supplying coolant to said coolant injecting nozzle and said spirally formed groove, said coolant supply means being provided with a rectifying vane.

8. The apparatus for cooling the tubular thin film according to claim 5 or claim 6, wherein said mandrel body is provided with a nozzle for injecting compressed air between said die and said mandrel body for keeping a shape of the upper bubble of the tubular thin film, said nozzle for injecting compressed air being provided with a rectifying vane radially spaced therefrom for rectifying the direction of the compressed air.

9. The apparatus for cooling the tubular thin film according to claim 1 wherein said seal ring is provided with an annular ring positioned in a lower part of said seal ring for scraping residual coolant remaining on the inner surface of the tubular thin film and a port communicating with said annular ring for discharging the removed coolant into the mandrel body.

10. The mandrel for cooling the tubular thin film of claim 9 in which said annular ring for scraping residual coolant comprises a suction ring for removing the coolant residually remaining on the inner surface of the tubular thin film by suction, said suction ring being made with a porous elastic body, and having a tip connected with a suction mechanism positioned in the lower part of said seal ring.

11. The apparatus for cooling the tubular thin film according to claim 3 including means circumferentially spaced about said mandrel body for adjusting flow of coolant from the coolant injecting nozzle.

12. The mandrel for cooling the tubular thin film of any one of claims 1, 2, 3, 4, 8 to 10 and 11 in which said mandrel body includes a chamber connected with said lower end of said mandrel body, said chamber receiving coolant passed in cooling relation with said thin film, and means for discharging coolant from said chamber out of said mandrel body.

13. The apparatus for cooling the tubular thin film according to claim 6 including means for injecting coolant to said coolant injection nozzle and said spirally formed grooves, said coolant supply means being provided with a rectifying vane.

14. The apparatus for cooling tubular thin film according to claim 5 or claim 11 in which said mandrel body includes a chamber connected with said lower end of said mandrel body, said chamber receiving coolant passed in cooling relation with said thin film, and means for discharging coolant from said chamber out of said mandrel body.

15. The apparatus for cooling tubular thin film according to claim 7 in which said mandrel body includes a chamber connected with said lower end of said mandrel body, said chamber receiving coolant passed in cooling relation with said thin film, and means for discharging coolant from said chamber out of said mandrel body.

16. The apparatus for cooling the tubular thin film according to claim 1, wherein said coolant injecting nozzle is formed with at least two stages of annular slits.

17. The apparatus for cooling the tubular thin film according to claim 1, wherein said coolant injecting nozzle is formed with one stage of annular slits, wherein said seal ring is provided with an annular ring positioned in a lower part of said seal ring for scraping residual coolant remaining on the inner surface of the tubular thin film and a port communicating with said annular ring for discharging the removed coolant into the mandrel body, wherein said annular ring for scraping residual coolant comprises a suction ring for removing the coolant residually remaining on the inner surface of the tubular thin film by suction, said suction ring being made with a porous elastic body, and having a tip connected with a suction mechanism positioned in the lower part of said seal ring, and wherein said mandrel body includes a chamber connected with said lower end of said mandrel, said chamber receiving coolant passed with said thin film, and means for discharging coolant from said chamber out of said mandrel body.

18. The mandrel for cooling the tubular thin film of claim 13 in which said mandrel body includes a chamber connected with said lower end of said mandrel body, said chamber receiving coolant passed in cooling relation with said thin film, and means for discharging coolant from said chamber out of said mandrel body.

* * * * *